Figure 1:
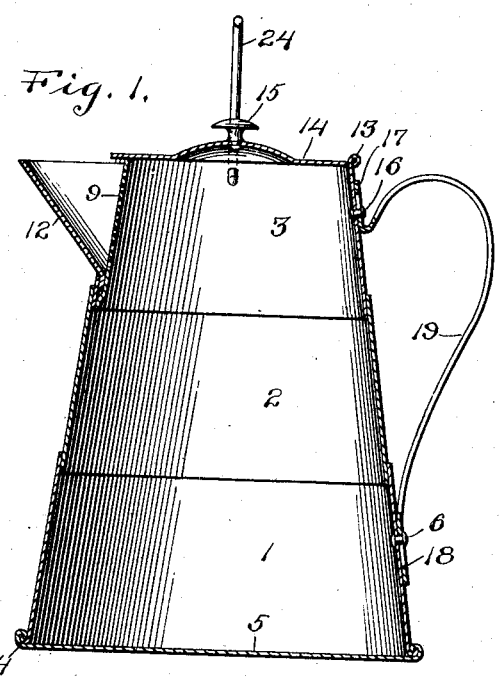

W. W. IRWIN.
COLLAPSIBLE COFFEE POT.
APPLICATION FILED NOV. 3, 1910.

994,520.

Patented June 6, 1911.

Witnesses

Inventor
W. W. Irwin
By
Attorneys

UNITED STATES PATENT OFFICE.

WALTER W. IRWIN, OF EL PASO, TEXAS.

COLLAPSIBLE COFFEE-POT.

994,520.  Specification of Letters Patent.  Patented June 6, 1911.

Application filed November 3, 1910. Serial No. 590,425.

*To all whom it may concern:*

Be it known that I, WALTER W. IRWIN, a citizen of the United States of America, residing at El Paso, in the county of El Paso and State of Texas, have invented certain new and useful Improvements in Collapsible Coffee-Pots, of which the following is a specification, reference being had therein to the accompanying drawing.

This invention relates to collapsible coffee pots and similar receptacles, and the object of the invention is to provide a coffee pot that can be easily collapsed or folded to occupy a comparatively small space.

My invention aims to provide a receptacle that can be easily and quickly collapsed whereby it will occupy a comparatively small space, and it is in this connection that the collapsible features of the receptacle have been especially devised for such receptacles as carried by automobilists and campers and for the kits of travelers. To this end, I have designed a frusto-conical shaped receptacle consisting of parts that can be easily collapsed, and frictionally held together when in a set-up position to provide a non-leakable receptacle, the receptacle when collapsed occupying approximately one-third the space occupied by the receptacle when set-up.

With this understanding of my invention reference will now be had to the drawing forming a part of this specification, wherein there is illustrated a preferred embodiment of the invention, but it is to be understood that the structural elements thereof are susceptible to such changes as fall within the scope of the appended claims.

Figure 2:
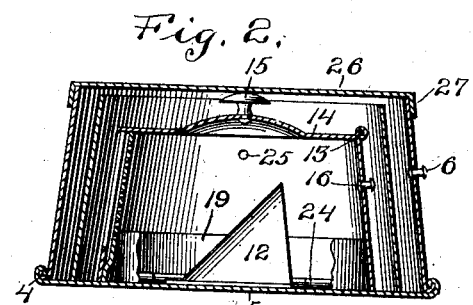
Figure 3:
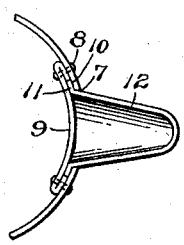
Figure 4:
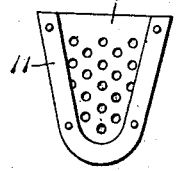
Figure 5:
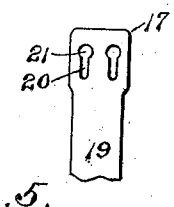
Figure 5:
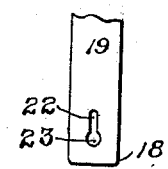

In the drawing: Figure 1 is a vertical sectional view of the receptacle in a set-up position. Fig. 2 is a similar view of the same in a knocked-down position. Fig. 3 is a plan of a portion of the receptacle showing the manner of attaching the spout thereto. Fig. 4 is an elevation of a detached strainer, and Fig. 5 is an elevation of a detached handle partly broken away.

As an example of a collapsible receptacle constructed in accordance with this invention, I have illustrated a coffee pot, comprising a base section 1, an intermediate section 2, and a top or lid section 3, each section comprising a frusto-conical shaped shell, the lower end of each shell being of a greater diameter than the upper end, whereby said shells can be extended and frictionally held together to form a receptacle of considerable capacity.

The lower edges of the shell 1 are reamed or provided with flanges 4 to which are connected the edges of a flat bottom plate 5. The shell 1 intermediate the upper and lower edges thereof is provided with a headed stud bolt or pin 6, for a purpose that will presently appear.

The section 3 is cut away to provide a V-shaped opening, as at 7, and riveted or otherwise connected, as at 8, to the inner wall of the section 3 is a perforated plate 9 serving functionally as a strainer or sieve, said perforated plate corresponding in curvature to the section 3 and in conjunction with the edges of said receptacle bordering upon the opening 7 providing vertical grooves or a seat 10 for the flanged edges 11 of a spout 12.

Hinged to the upper edge of the section 3, as at 13, at a point diametrically opposite the opening 7 is a lid or cover 14 having a knob or handle 15, whereby the lid can be easily opened.

The shell 3 opposite the opening 7 is provided with stud bolts or pins 16, similar to the stud bolts 6 and adapted to be detachably connected to these bolts are the upper and lower ends 17 and 18 of a flexible handle or strap 19, the upper end of the handle having two slots 20 terminating in openings 21 and the lower end 18 of the handle a single slot 22 terminating in an opening 23, the openings 21 and 23 providing clearance for the heads of the stud bolts 6 and 16 when placing the handle in engagement with the sections 1 and 3, the handle being adjusted whereby the stud bolts engage in the slots 20 and 22 and detachably retain the handle in engagement with said sections.

A bail 24 can be used in connection with the receptacle, the bail having the lower ends thereof detachably mounted in openings 25 provided therefor in the side walls of the section 3.

A cover 26 having a depending flange 27 can be used to close the base section 1 after the sections 2 and 3 have been assembled therein, together with the spout 12, the bail 24 and the handle 19. As the handle 19 and the bail 24 are made of flexible material, they can be easily placed in the section 3 together with the spout 12.

The receptacle in its entirety is made of light and durable metal and can be made of various sizes.

It will be observed that the resiliency or flexibility of the handle 19 assists in retaining the sections 1, 2, and 3 in extended or set-up position.

What I claim, is:

A collapsible coffee pot comprising a frusto-conical-shaped base, intermediate and lid sections, said base section of greater diameter than the intermediate section, and said intermediate section of greater diameter throughout than said lid section, each of said sections gradually decreasing in diameter upwardly and capable of being extended with respect to each other and the intermediate section frictionally engaging the inner face of the base section and the outer face of the lid section whereby the sections will be held in an extended position, a bottom secured to the base section, a lid connected to the lid section, said lid section cut away to provide an opening, a perforated plate opposing said opening and having its ends bent upon itself and with the bent portions secured to the inner face of the lid section whereby said plate will be spaced from and provide in connection with the lid section a pocket, a spout having a flange detachably mounted in said pocket and projecting through said opening, and a handle detachably connected with the lid and base sections, said base section capable of receiving the other elements of the pot.

In testimony whereof I affix my signature in the presence of two witnesses.

WALTER W. IRWIN.

Witnesses:
MARY CHRISTY IRWIN,
GEO. B. OLIVER.

---

Copies of this patent may be obtained for five cents each, by addressing the "Commissioner of Patents, Washington, D. C."